Figure 1:
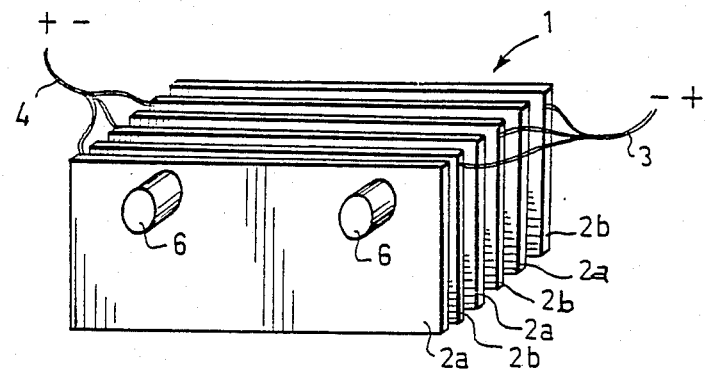

United States Patent [19]

Valanti et al.

[11] Patent Number: 4,770,755
[45] Date of Patent: Sep. 13, 1988

[54] ELECTRODE UNIT TO BE USED FOR PURIFICATION OF EMULSIONS AND POLLUTED WATERS, ESPECIALLY OIL-BEARING WATERS, BY MEANS OF ELECTROLYSIS

[75] Inventors: Pentti A. Valanti, Helsinki; Martti T. J. Haario, Turku; Mikko Maunula, Lahti, all of Finland

[73] Assignee: Eleclean Oy, Imatra, Finland

[21] Appl. No.: 30,850

[22] PCT Filed: Jun. 17, 1986

[86] PCT No.: PCT/FI86/00064
§ 371 Date: Mar. 3, 1987
§ 102(e) Date: Mar. 3, 1987

[87] PCT Pub. No.: WO86/07586
PCT Pub. Date: Dec. 31, 1986

[30] Foreign Application Priority Data

Jun. 17, 1985 [FI] Finland ............................. 852402

[51] Int. Cl.$^4$ .......................................... C25D 17/00
[52] U.S. Cl. .................................. 204/225; 204/228; 204/269; 204/286; 204/292; 204/304; 204/305
[58] Field of Search ............... 204/186, 188, 267–269, 204/288, 289, 286, 302, 149, 225, 228, 304, 305

[56] References Cited

U.S. PATENT DOCUMENTS

| | | | |
|---|---|---|---|
| 2,545,413 | 10/1947 | Perret-Bit | 204/225 |
| 3,769,196 | 3/1971 | Wikey | 204/275 |
| 4,048,031 | 9/1977 | Valanti | 204/275 |
| 4,179,347 | 12/1979 | Krause et al. | 204/275 |
| 4,288,309 | 9/1981 | Cohen | 204/269 |

FOREIGN PATENT DOCUMENTS 2901850 7/1980 Fed. Rep. of Germany ...... 204/149

Primary Examiner—John F. Niebling
Assistant Examiner—Kathryn Rubino
Attorney, Agent, or Firm—Scully, Scott, Murphy & Presser

[57] ABSTRACT

This invention is directed to an electrode unit to be used for purification of emulsions and polluted waters, especially oil-bearing waters, by electrolysis which comprises vertically placed adjacent electrode plates of a soluble material, spacers for adjusting the distance between the electrode plates and equipment for adjusting the depth of immersion of the electrode plates. The tips of the electrode plates defines the only area of the plates in contact with the liquid to be purified and the depth of immersion of the electrode plates is adjusted in order to keep the current density between the electrode tips within a desired area. In addition, the space in between the plates is also adjusted in order to keep the current density between the electrode tips within the desired area.

6 Claims, 2 Drawing Sheets

ELECTRODE UNIT TO BE USED FOR PURIFICATION OF EMULSIONS AND POLLUTED WATERS, ESPECIALLY OIL-BEARING WATERS, BY MEANS OF ELECTROLYSIS

The invention relates to an electrode unit to be used for purification of emulsions and polluted waters, especially oil-bearing waters, by means of electrolysis in the manner that the liquid to be treated is made to flow past electrode tips which form an adjustable spacing between each other.

A purification method of the kind described above is known from the U.S. Pat. No. 4 048 031. One of its electrodes is a soluble aluminium electrode and the other electrode, primarily the cathode, is a plate, a trough or a drum or another corresponding stationary construction. According to this known method, the purification is carried out so that the liquid to be purified is made to flow along one of the electrodes through the spacing formed by the electrode tips so that the spacing between the tips is not immersed in the liquid to be treated. In this way, a narrow path of current or a path of current with a small cross-section is created, where the current density is relatively high. By means of this and by means of that the angle of curvature of the tips is as little as possible, a so-called "tip effect" is created, which very effectively makes the impurities in the liquid to be purified to flocculate, whereby they can be removed from the liquid by conventional methods. According to the U.S. patent mentioned, one anode or several anodes, e.g. a threadlike or a platelike anode, are suggested to be used, which anodes are arranged vertically or in an oblique position with respect to the cathode, which is made e.g. of stainless steel in the form of a trough, a level, a rotating roll or a plate. Thus, it is not possible to reach very high total purification effects by means of such an equipment and, on the other hand, feeding soluble anodes presupposes an automatic equipment which, especially when several anodes are used, makes the equipment itself more complicated. Consequently, such an equipment is fitted to be used only as a part of an industrial purification plant in the first place and it is unthinkable to apply it as such under circumstances prevailing in the nature or in other provisional arrangements.

Thus, the object of the present invention is to disclose an electrode unit which already as such can be used for electrolytical purification without absolutely needing a special circulating or operating equipment with the exception of a current feed unit.

The object above has been reached by an electrode unit according to the invention, characterized in that the electrodes consist of vertically placed adjacent plates made of a soluble material and insulated from each other, and that the electrode unit comprises means for keeping the current density between the electrode tips, i.e. the so-called "tip effect", within an area desired. By the means mentioned, the depth of immersion in the liquid for the electrode plates and their mutual distance from each other are adjusted to the value desired. The means for adjusting the depth of immersion of the electrodes can comprise a controllable suspension mechanism for the electrodes or a plate or a counterpart made of an insulating material, on which the electrode unit is resting. In this way for instance, the current density between the electrodes can be kept high, and on the other hand, the liquid to be purified can be led through the spacings between the electrode tips, whereby it can be subjected to the strong tip effect mentioned. Preferably, every second plate of the electrode unit is electrically connected to each other and fed by means of a direct-current supply, whereby the polarity of the voltage fed is changing periodically. Preferably, the current fed by the direct-current supply can, moreover, be pulsatory to intensify the tip effect. Consequently, due to the pulsatory current and especially due to the commutation of the polarity, it is firstly possible to effectively prevent a passivation of the electrodes and secondly, an even abrasion of the electrodes is effected.

Figure 2:
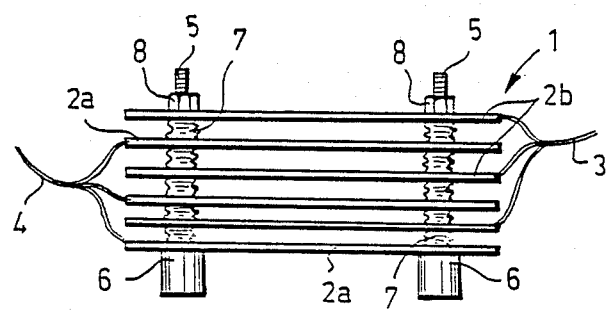
Figure 3:
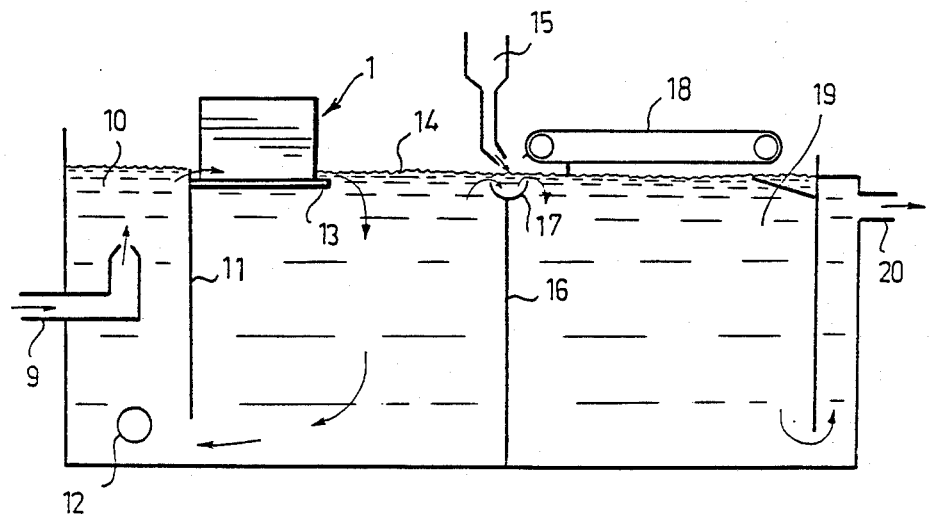
Figure 4:
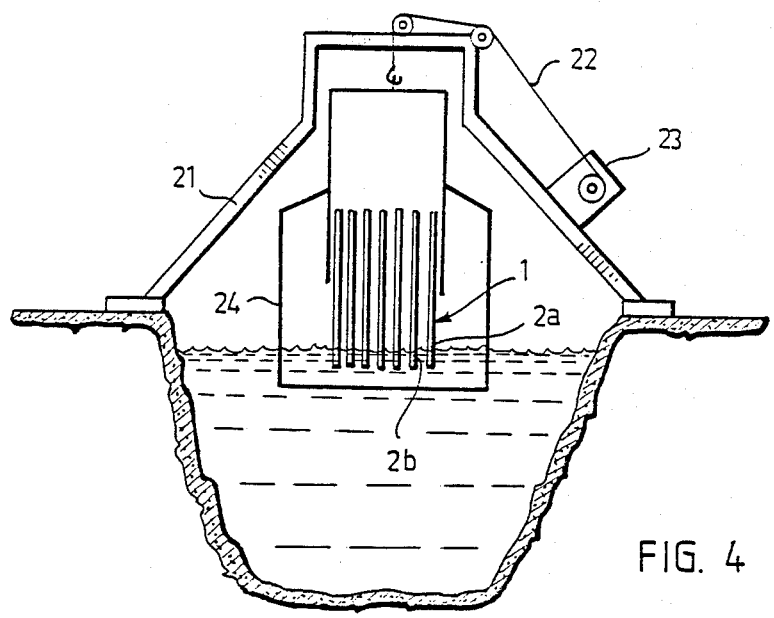
Figure 5:
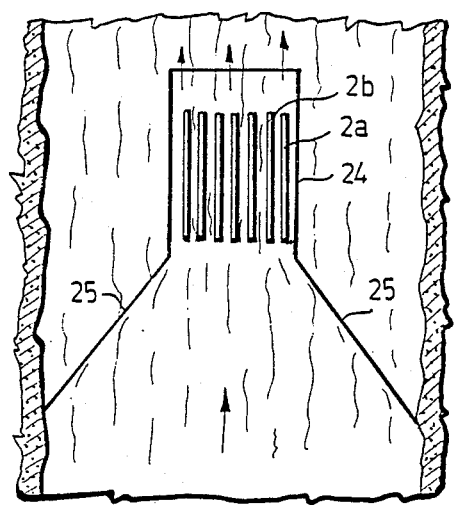

In the following, an electrode unit of the invention is described in more detail by means of exemplifying embodiments with reference to the drawings enclosed, where FIG. 1 shows schematically the illustrative structure of an electrode unit of the invention in perspective, FIG. 2 shows the electrode unit of FIG. 1 from above, FIG. 3 shows the use of the electrode unit of the invention as a part of a purification plant, FIG. 4 shows another way to use the electrode unit of the invention and FIG. 5 shows a section of the object of figure 4 at the altitude of the liquid level.

FIG. 1 shows schematically an electrode unit 1 according to the invention, comprising several vertically placed electrode plates 2a and 2b made of a soluble material as aluminium. These aluminium plates 2a and 2b are electrically insulated from each other. The plates 2a are electrically connected with each other and the plates 2b likewise with each other, whereby spacings are formed between the tips of the plates 2a and 2b. FIG. 1 shows the plates alternatingly connected with each other by means of conductors 3 and 4, through which the electrode plates are fed with direct-current. As shown in the figure, the polarity of the direct-current supply is changed at regular intervals in order to prevent a passivation of the electrode plates and in order to reach an even abrasion. Additionally, the current can preferably be pulsatory, whereby the tip effect becomes more efficent than it was before. FIGS. 1 and 2 show the electrode plates with their upper parts joined to each other by means of insulating axles 5 led through the pack of electrodes.

In order to be able to keep the current density between the electrodes at a desired value, whereby the most efficient possible electrolysis is reached by means of the minimum total current, the spacing between the electrodes shall also be adjustable for instance within an area of 5-35 mm. As one possible embodiment, the construction of FIG. 2 can then be shown, whereby between the electrodes round the axles 5 are arranged spacing pieces 7 being flexible as bellows and made of an insulating material. By turning nuts 8 arranged on the axles 5, the spacing between the electrodes can be adjusted as desired. When the nut 8 is screwed tighter, every bellowlike spacing piece 7 is compressed equally, whereby the spacings of the electrode unit remain even. When the nut 8 is loosened, the bellowlike spacing pieces 7 widen the electrode spacing evenly. As one embodiment, the nut 8 can e.g. be fastened at the electrode plate 2b located below the nut and the axle 5 can be turned at its oppposite end either by hand or by means of a torsion motor 6. It should be understood that the described arrangement for adjusting the spacing between the electrodes is only one example of the numerous possibilities by means of which the electrode spacings can be adjusted. As other alternatives can be mentioned wedge-shaped or elliptic structures arranged between the electrodes, whereby the electrode spacings can be adjusted as desired by moving or rotating these structures. Further, expansion units adjustable by means of gas or liquid can be used. Additionally, it is understandable that the adjustment can be built very simply even automatic, whereby the electrode spacings are adjusted automatically on the basis of the total current needed by the electrode unit, in order to provide a desired current.

As it already appeared from above, the operation of the invention is based thereon that a high current density is effected between the lower edges of the electrodes. This can be provided e.g. when the depth of immersion of the electrode unit is kept prefereably low. In case that a suspended electrode unit is used, the abrasion of the electrodes can be observed through a change in the total current, capacitively, by means of photocells or other known sensors or methods. By means of a signal thus gained and amplified in a known manner, the depth of immersion is corrected automatically or by hand. if the embodiment shown in FIG. 3 is used, whereby the electrode unit with its own weight and leaning on the tips of some or all electrodes is resting on a base 13 made of an insulating material, the depth of immersion is corrected automatically by means of gravity along with the abrasion of the electrodes.

FIG. 3 shows an embodiment of the electrode unit of the invention. There, the electrode unit is arranged into contact with a purification basin, into which the liquid to be purified is fed through an inlet 9. From this inlet the liquid to be purified comes into a space 10, from where it can be made to flow, e.g. as an overflow over a wall 11 between the plates of the electrode unit 1. If the electrode unit 1 is suspended to hang in the liquid to be purified, whereby the lower edge of the electrode plates is open and the liquid thus can flow out from between the plates after having run a certain distance between them, a circulation of the liquid to be purified shall be carried out in the purification equipment e.g. by means of a circulating pump or by air blow 12. In case of FIG. 3, the electrode unit 1 is placed to support on a plate 13 made of an insulating material, whereby it is made sure that all the liquid to be purified flows between the electrode plates and along the length of the whole electrode unit 1. By means of the electrode unit 1, a formation of floc 14 is effected on the surface of the liquid to be purified, which flocculation and further treatment of floc can be forwarded by feeding the liquid to be purified with polyelectrolyte from a unit 15, which is arranged e.g. in the basin on a dividing wall 16 and a trough 17 arranged at its upper edge. The floc so produced is removed from the surface of the liquid space e.g. by means of a scraper 18. The purified and treated liquid flows away from a basin space 19 below the scraper through an outlet channel 20 attached to its lower edge.

FIG. 4 shows schematically another application of the electrode unit of the invention, whereby the electrode unit 1 leaning on a supporting structure 21 is placed to hang above an open ditch. The electrode unit 1 is supported above the ditch by means of a wire 22 and a winding gear 23 attached to it so that the lower edge of the plates 2a and 2b of the electrode unit 1 to some extent sink into the water. Leaning on the same supporting structure 21 a through-shaped control plate 24 is arranged below the electrode unit 1, by which control plate the surface water of the ditch is led to the electrode unit. As it appears from FIG. 5, to the sides of the trough 24 are additionally attached e.g. floating control booms 25, by means of which the surface water of the whole ditch can be led towards the electrode unit 1. The trough 24 is supported at a suitable distance below the electrode plates 2a and 2b, whereby its height shall be adjustable along with the abrasion of the electrode plates. Another alternative would be to manufacture the trough 24 of an insulating material, whereby the electrode unit could be arranged to rest on it according to the embodiment of FIG. 3. The arrangement shown in the FIGS. 4 and 5 is especially appropriate when floating impurities, like oil, are removed from water.

Only one exemplifying structure of the electrode unit of the invention and two embodiments thereof are described above. It is understandable that in the structures of the FIGS. 3–5 only the electrode unit 1 and its arrangement are substantial and other described parts have no influence as to the scope of protection of the present invention. An electrode unit according to the present invention could be imagined to be used in applications of quite different types from that described in the FIGS. 3–5. It could be thought to be used also e.g. as a floating equipment in connection with a sea, a lake, a water basin, a clearing basin and the like.

As to the present invention, the only essential is that the electrode unit in some way can be immersed in the liquid to be purified so that only its edge part sinks into this liquid and that the electrode unit along with the abrasion is lowered either by means of an equipment provided for that purpose or automatically due to gravity, as in the equipment shown in FIG. 3.

We claim:
1. Electrode unit to be used for purification of emulsions and polluted waters, especially oil-bearing waters, by means of electrolysis, said unit comprising
   vertically placed adjacent electrode plates of soluble material, said electrode plates having tips forming a spacing between each other and being the only area of said electrode plates in contact with the liquid to be purified,
   means for adjusting the spacing between the electrode plates in order to keep current density between the electrode tips within a desired area, and
   means for adjusting the depth of immersion of the tips of said electrode plates into the liquid to be purified in order to keep current density between the electrode tips within a desired area.
2. Electrode unit according to claim 1 wherein the means for adjusting the spacing between the electrodes comprise spacing pieces arranged between the electrodes, the size of said pieces being variable by means of compression or expansion, and means for regulating the compression or expansion of said spacing pieces.
3. Electrode unit according to claim 1 wherein the means for adjusting the depth of immersion comprise a supporting structure, lifting devices supported by the supporting structure and bearing the electrode plates, and detecting instruments for observing the abrasion of the tips of the plates.
4. Electrode unit according to claim 1 or 2 wherein the means for adjusting the depth of immersion comprise an insulating base on which the electrode plates are arranged to rest with their own weight on at least some of the tips of the plates.

5. Electrode unit according to claim 1 wherein every second one of the plates of the electrode unit insulated from each other are connected with each other electrically for forming two groups of electrodes which are fed from a direct-current supply with an opposite and periodically changing polarity.

6. Electrode unit according to claim 5 wherein direct-current is fed in the form of pulses.

* * * * *